UNITED STATES PATENT OFFICE.

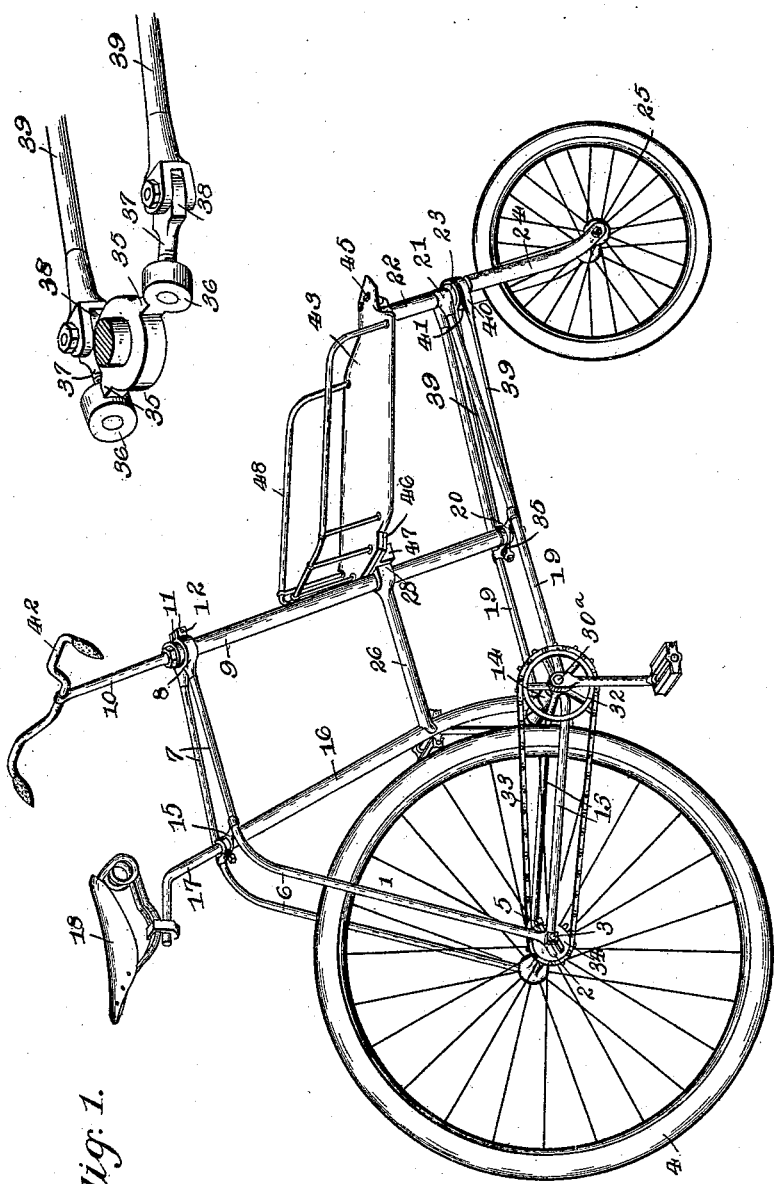

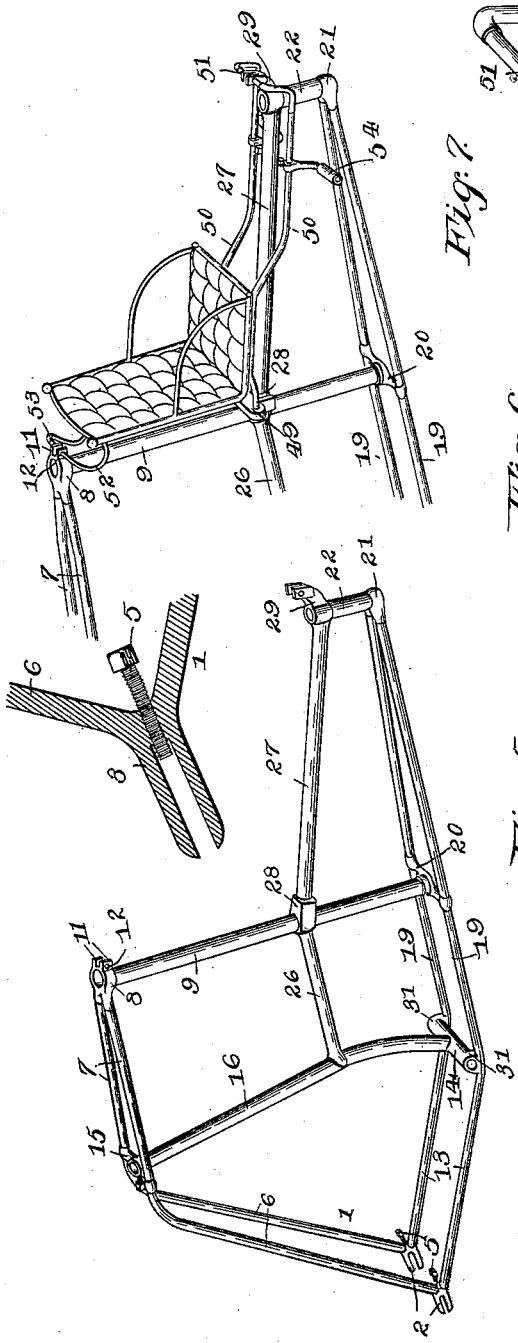

IGNATIUS L. UNTERBRINK, OF FRYBURG, ASSIGNOR TO C. A. LAYTON, OF WAPAKONETA, OHIO.

BICYCLE.

SPECIFICATION forming part of Letters Patent No. 530,249, dated December 4, 1894.

Application filed May 1, 1894. Serial No. 509,709. (No model.)

*To all whom it may concern:*

Be it known that I, IGNATIUS L. UNTERBRINK, a citizen of the United States, residing at Fryburg, in the county of Auglaize and State of Ohio, have invented a new and useful Bicycle, of which the following is a specification.

My invention relates to bicycles, and has for its object to provide a luggage or extra-load machine adapted for the transportation of baggage, a passenger other than the operator, &c.

In a machine designed for carrying an extra load it is essential to secure an extended wheel-base, to arrange the steering-bar which carries the handles near enough to the seat or saddle to enable the rider to maintain a substantially upright position while operating the pedals, to arrange the saddle over the rear or driving-wheel in order to secure the necessary weight upon said wheel to secure sufficient friction with the surface to prevent slipping of such wheel, to arrange the extra load within the wheel-base or between the points of contact of the driving and steering wheel with the ground, to equalize as far as possible the weight of the rider and the extra load or luggage and distribute the same in the proper proportion between the driving and steering wheels, and to arrange the extra load or luggage as low or as near the wheel-base as possible in order to increase the stability of the machine when in motion and enable the rider to preserve its equilibrium with facility; and in the construction of my improved machine I have considered the above essential points, and it is the object of my invention to embody the same in a bicycle adapted for carrying either luggage or an extra or child's seat.

Further objects and advantages of the invention will appear in the following description, and the novel features thereof will be particularly pointed out in the appended claims.

In the drawings:—Figure 1 is a perspective view of a machine embodying my invention, showing the luggage support in operative position. Fig. 2 is a detail view of the frame. Fig. 3 is a view showing the child's seat applied in the operative position. Fig. 4 is a detail view of the rear plate and depending lugs for the rest. Fig. 5 is a vertical transverse section of the front connection of the rest to the frame of the machine. Fig. 6 is a view of the rear holding device for use in connection with the child's seat. Fig. 7 is a similar view of the front portion of the frame of the child's seat. Fig. 8 is a detail sectional view of the means for adjusting the rear axle to take up slack in the driving-chain. Fig. 8$^a$ is a detail view of the connection between the steering-bar and the connecting-rods which communicate the motion thereof to the steering-head.

Similar numerals of reference indicate corresponding parts in all the figures of the drawings.

The frame of the improved machine consists essentially of a triangular rear portion formed by the V-shaped side-bars 1, at the opposite apexes of which are formed integral rearwardly extending boxes 2 for the reception of the bearing-axle 3 of the rear or driving wheel 4. The construction of the bearing of this wheel does not form a part of my present invention, but the axle is fitted at its extremities in the said boxes, which are essentially slots formed in rearwardly projecting ears at the apexes of the V-shaped side bars, and threaded in perforations formed at said apexes are adjusting-screws 5, which bear at their rear ends against the front side of said axle, whereby the latter may be adjusted to take up slack in the driving-chain, as hereinafter more fully explained.

The upper arms 6 of the V-shaped side-bars converge toward their upper ends, and after reaching a point slightly above the plane of the upper side of the driving wheel, are bent forward and extended to form the forwardly convergent side-braces 7, which are connected at their front extremities by a forged coupling 8, in which is secured the upper end of the bearing-sleeve 9 of the steering-bar 10. Said coupling is provided at its front side with projecting parallel ears 11 provided with perforations 12, for a purpose hereinafter explained.

The lower arms 13 of the V-shaped side-bars decline toward their front ends until they reach a point slightly beyond the periphery of the driving-wheel, where they are connected by a cross-bar 14, and this cross-bar is connected with a similar cross-bar 15, connecting the upper arms of the V-shaped side-bars by a tubular brace and wheel-guard 16 in which is slidably and adjustably fitted the seat-standard 17 bearing the saddle 18. The upper portion of this combined brace and guard is straight and is inclined slightly to the rear, whereby the seat-standard is held in a similar inclined position to bring the saddle over the driving-wheel and slightly in advance of the axis thereof, whereby the greater portion of the weight of the rider is supported by the driving-wheel, and at the same time the stability of the machine is preserved, even when no extra weight is applied to the front of the machine.

The lower arms of the V-shaped side-bars from their point of connection by the above described cross-bar are extended forward and upward in parallel lines, as shown at 19, and are connected by a cross-bar 20, in which is secured the lower end of the bearing-sleeve of the steering-bar, and from said point of connection by the cross-bar 20, the side-bars are extended forward upon an upward inclination and converge to their point of connection by the forged coupling 21. This coupling supports the lower end of the bearing-sleeve 22 for the steering-head 23, said steering-head being extended to form the steering-wheel forks 24 carrying the steering-wheel 25.

The combined brace and guard 16 is connected at an intermediate point with the bearing-sleeve for the steering-bar by a substantially horizontal strut-brace 26, said brace being, however, inclined slightly upward toward its front end, and extending from the said bearing-sleeve at the point of connection therewith of said strut-brace is a brace 27, which is secured at its front end to the upper end of the bearing-sleeve for the steering-head. This brace 27 also acts as a strut-brace, and may be, and preferably is, formed integral with or as an extension of the strut brace connecting the upright brace and wheel-guard with the bearing-sleeve for the steering-bar, the function of said brace 27 being to relieve the side-bars of transverse strain caused by the steering-wheel. The brace 27 is provided at its rear end adjacent to the bearing-sleeve or the steering-bar with an angular forging 28, and at its front end beyond the steering-head with a projection 29 having parallel ears which are perforated for the reception of a bolt 30.

Thus it will be seen that the front portion of the frame of the improved machine consists of forwardly convergent upper and lower members, the lower member comprising the forwardly convergent side-bars, and the upper member consisting of the downwardly inclined brace 27, said upper and lower members being connected by the portion of the bearing-sleeve of the steering-bar which is interposed therebetween.

The crank-shaft 30ª is mounted in bearings formed in ears 31 rising from the side bars adjacent to the lower end of the combined brace and guard 16, said crank-shaft being provided with a chain-wheel 32, which is connected by means of the chain 33 with the chain-wheel 34 on the driving-wheel, and it will be understood that by means of the adjusting-screws which bear against the axle of the driving-wheel and are arranged in the side-bars of the frame, as above described, the tension of said chain may be adjusted to take up wear, slackness, &c.

The steering-bar extends below the lower end of the bearing-sleeve in which it is mounted and is provided with lateral arms 35, which incline to the rear toward their outer ends and terminate in threaded sockets 36, in which are fitted the bolts 37, said bolts terminating at their front ends in ears 38, to which are pivotally connected the rear ends of the connecting-rods 39, said rods being attached at their front ends to the extremities of a flexible band 40, which passes around an enlarged portion 41 of the steering-head and is secured at an intermediate point thereto, whereby the motion of the steering-bar imparted thereto by means of the steering-handles 42 will be communicated to the steering-head, and the leverage of said handles will remain the same in all positions of the steering-wheel.

The luggage support which I have shown in connection with the improved machine, consists of a flat rest 43, provided at its front end with a depending tongue 44 fitting between the ears on the projecting portion of the brace 27 and secured in place by means of a bolt 30 engaging the perforations in said ears and tongue, said tongue depending from a plate which is secured to the under side of the rest by bolts 45. The rear end of said rest is provided with a transverse brace plate 46 having depending parallel lugs 47 which engage upon opposite sides of the angular forging at the rear end of said brace 27. This rest may be provided with an upstanding guard 48 of any preferred construction to prevent parcels arranged in the support from being displaced.

In Fig. 3 I have shown a child's seat arranged in connection with the machine, and in the construction illustrated the seat is supported upon the rear end of the brace 27 by means of a supporting-plate 49 having depending lugs to engage the above mentioned angular forging. The seat is provided with side-bars 50, which extend forward and are connected by a transverse pin 51 fitting in perforations in the ears of the projection 29, the rear ends of said side-bars being fixed to the plate 49. The back of the seat proper is provided at its top with a curved spring 52 having a transverse terminal portion 53, which engages the perforations 12 in the ears 11. Adjustable foot-rests 54 are arranged upon the side-bars 50.

From the above description it will be seen that the support or rest is arranged below the plane of the upper side of the driving-wheel and close to the plane of the steering-wheel, the latter being made smaller than the driving-wheel in order to arrange the support or rest in as low a plane as possible. It will be seen also that the support or rest is arranged to bring the center of gravity of the load supported thereon within the wheel-base, and the peculiar arrangement of the side-bars and brace 27 at the front end of the machine braces the same against vertical and lateral strains.

It will be understood that various changes in the form, proportion, and the minor details of construction may be resorted to without departing from the spirit of the invention or sacrificing any of the advantages thereof.

Having described my invention, what I claim is—

1. In a bicycle, the frame having V-shaped side-bars, the lower arms of which incline downward to a point beyond the periphery of the driving-wheel and then incline upward and converge toward their front ends to a point of attachment on the steering-head, a brace and wheel-guard connecting the lower arms of the side-bars at a point adjacent to the front side of the driving-wheel with the upper arms of the side-bars, a seat-standard supported by said brace and guard, a steering-bar bearing-sleeve arranged in advance of said brace and secured at its lower end to the upwardly inclined portions of the side-bars, forwardly convergent braces extending from the upper arms of the side-bars to the said bearing-sleeve, a brace extending from an intermediate point of the bearing-sleeve to the upper end of the steering-head, and means for supporting a load in advance of the bearing-sleeve and between the same and the steering-head, substantially as specified.

2. The herein described bicycle framework having V-shaped side-bars provided at their apexes with means for attachment of the axle of the driving-wheel, forwardly convergent brace-bars 7 connected respectively with the upper arms 6 of said side bars and united at their front extremities by a coupling 8, the lower arms 13 of the side bars being extended forward and inclined upward as at 19, a coupling 21 connecting the adjacent extremities of the lower arms of said side bars, a brace 16 connecting the lower and upper arms of the side bars in advance of the driving-wheel, means for attaching a seat standard to said brace, a bearing-sleeve 9 connecting the lower arms of the side bars in advance of said brace with the forwardly convergent braces which are connected to the upper arms of the side bars, a bearing-sleeve 22 secured to the coupling at the front ends of the lower arms of the side bars, a strut brace connecting intermediate points of the brace 16 and the bearing-sleeve 9, and a brace 27 connecting an intermediate point of the said bearing-sleeve with the bearing-sleeve 22 at the front ends of the lower arms of the side bars, substantially as specified.

3. In a bicycle, the combination of a frame having a front portion comprising forwardly convergent upper and lower members connected at their front ends to the steering-head, said upper member being extended in advance of the steering-head to form parallel ears and being provided at its rear end with an angular forging, and a luggage carrier provided at its front end with a depending tongue connected to said ears and at its rear end with depending lugs to engage said forging, substantially as specified.

In testimony that I claim the foregoing as my own I have hereto affixed my signature in the presence of two witnesses.

IGNATIUS L. UNTERBRINK.

Witnesses:
JOHN H. SIGGERS,
GEO. C. SHOEMAKER.